Jan. 18, 1938.   I. J. B. DEMERS   2,105,907
ELECTRIC WELDING MACHINE
Filed Nov. 25, 1936   2 Sheets-Sheet 2
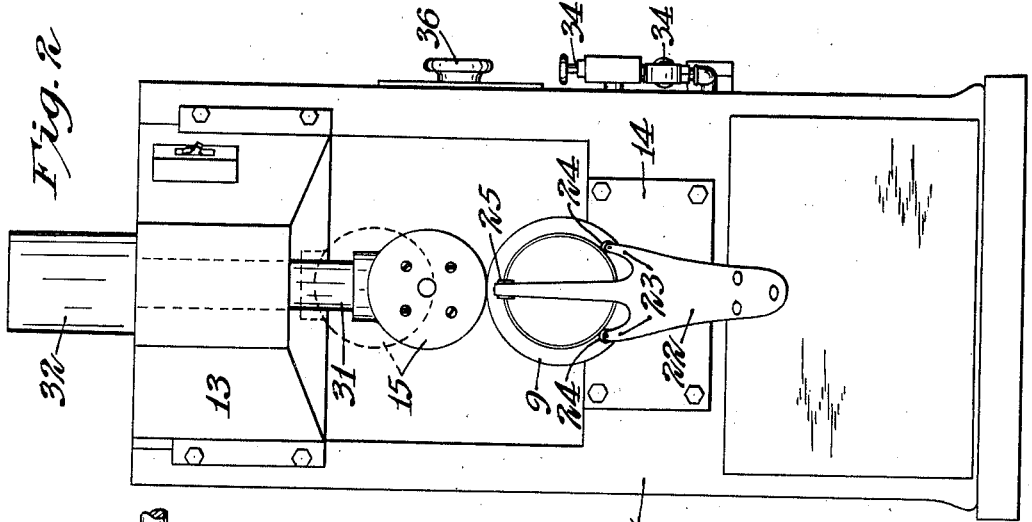
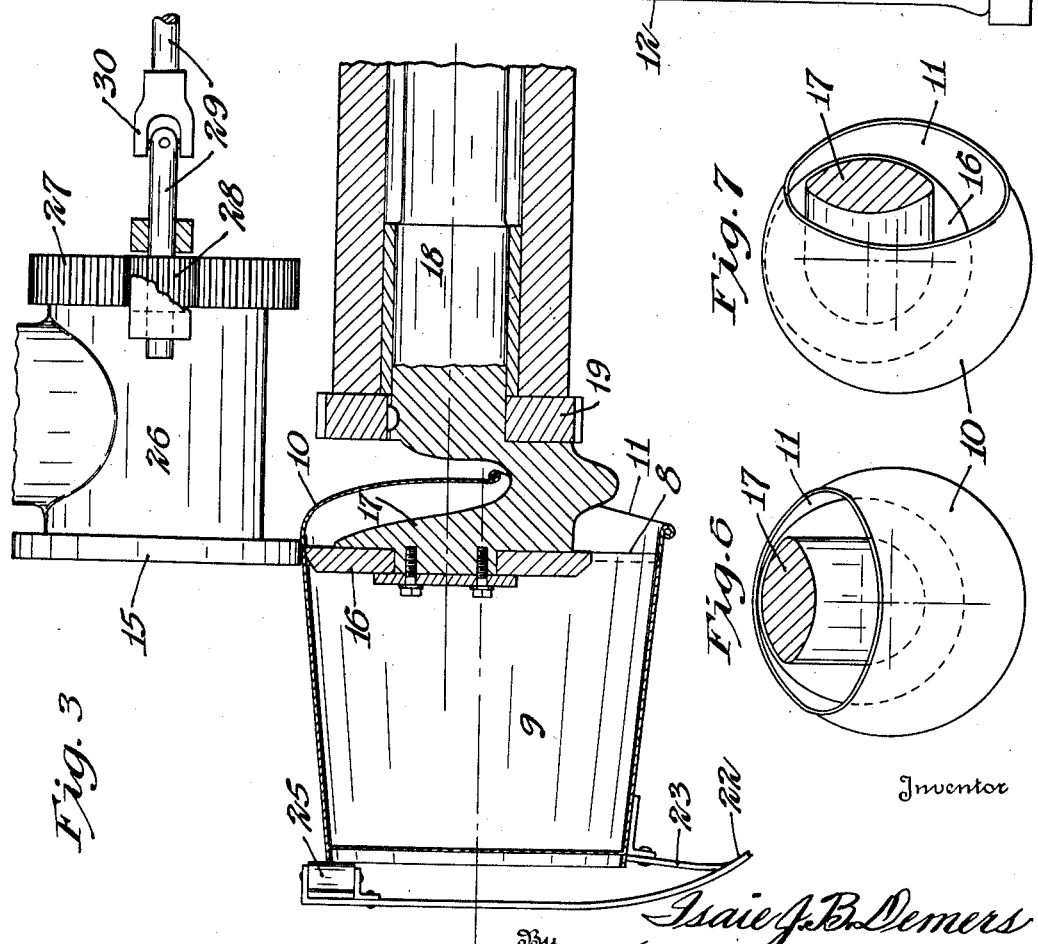
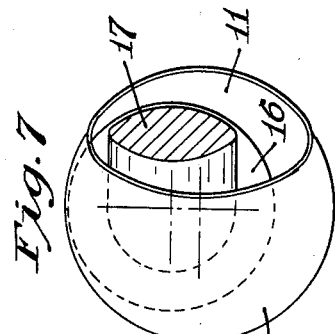
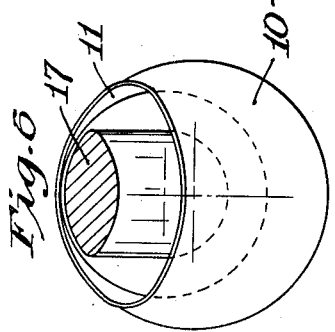

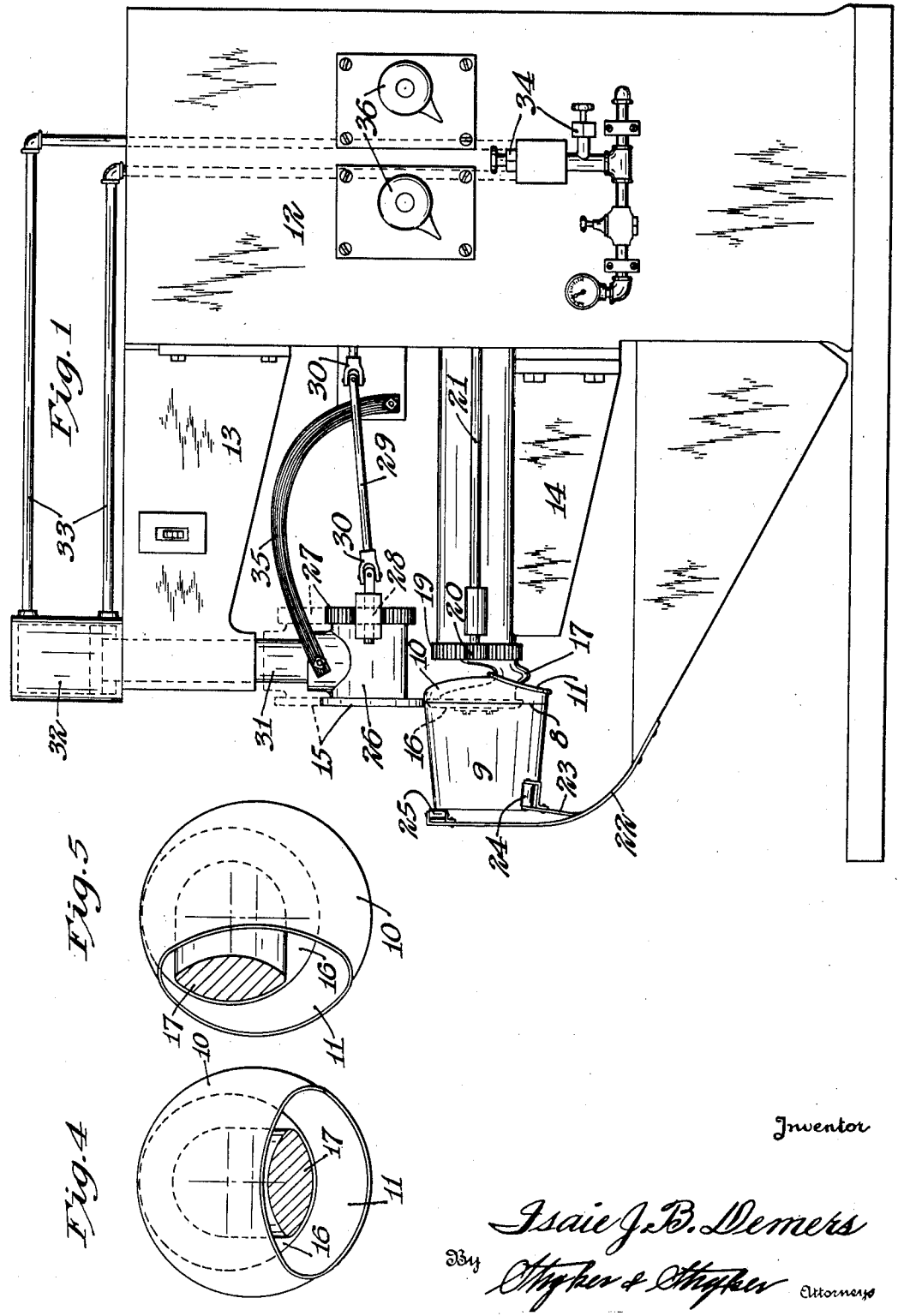

Patented Jan. 18, 1938

2,105,907

UNITED STATES PATENT OFFICE 2,105,907

ELECTRIC WELDING MACHINE

Isaie J. B. Demers, St. Paul, Minn., assignor to Superior Metal Products Company, St. Paul, Minn., a corporation of Delaware Application November 25, 1936, Serial No. 112,750

10 Claims. (Cl. 219—4)

It is an object of this invention to provide an electric welding machine for use on tanks, containers or other sheet metal structures where the openings in such structures which are available for access to the interior surfaces thereof are off center or eccentric to the joint to be formed.

Other objects will appear and be more fully pointed out in the following specification and claims.

In the accompanying drawings,

Figure 1 is a side elevation of my improved machine with a container in position for welding;

Fig. 2 is an end view of the machine and container;

Fig. 3 is a part central vertical section and part side elevation, on a larger scale, illustrating the principal novel features of the invention, and Figs. 4, 5, 6, and 7 are diagrammatic views illustrating the relative positions of the container, inner welding wheel and supporting horn therefor at various stages of a welding operation.

My machine is adapted to weld a joint such as that indicated by the numeral 8 in the drawings at the junction of the walls 9 with the top 10 of a container having the opening 11 offset laterally from the axis of the container and joint 8. The container 9 is a milk pail of common type, but it will be understood that my improved machine is adapted for general use where the opening through which one of the welding wheels must be inserted is located in such position that ordinary welding machines, such as those having a straight axial shaft supporting the inside welding wheel, cannot be used.

In the drawings the numeral 12 indicates the main frame of the machine having large brackets 13 and 14 for supporting upper and lower welding wheels 15 and 16 respectively. The wheel 16 is freely revoluble on one end of a U-shaped horn 17 having an axially offset portion adapted to enter and move in the opening 11. The horn 17 is fixed on an end of a supporting shaft 18, the axis of which is disposed in continuation of the axis of the wheel 16. Bearings for the shaft 18 are provided on the bracket 14 and keyed to this shaft near the horn 17 is a spur gear 19 adapted to be driven by a pinion 20. A power driven shaft 21 has a bearing on the frame and drives the pinion 20.

To support and guide the container to be welded, I provide a bracket 22 having branches 23 supporting rollers 24 on which the container rests and another branch supporting a roller 25 engaging the edge of the walls 9 at the upper periphery thereof when in position on the machine.

The upper welding wheel 15 is secured to the end of a shaft journaled in a bearing 26 and adapted to be driven by a gear 27. A pinion 28 drives the gear 27 and is fixed on a driving shaft 29. Flexible joints 30 in the shaft 29 allow the necessary movement of the bearing 26 and wheel 15 to and from the work. A vertical plunger 31 supports the bearing 26, has bearings permitting movement in the bracket 13 and is actuated by fluid pressure in a cylinder 32 supported on the top of the bracket 13, a suitable piston being provided within the cylinder. Fluid for actuating the piston is supplied through pipes 33 extending to a source of fluid under pressure and under control of valves 34. Electric current for the welding operation is supplied to the welding wheel 15 through a flexible conductor 35 and the circuit is completed through the lower welding wheel 16, horn 17 and shaft 18. Switches for controlling the current supply are indicated by the numeral 36.

In operation the wheel 15 is raised to its dotted line position indicated in Fig. 1 while the work is placed on the lower welding wheel 16. The diameter of the wheel 16 is such that it may be inserted through the opening 11 in the container and the horn 17 is so formed as to permit it to pass into the opening 11 and to allow the necessary relative movement between the opening 11 and axis of the wheel 16 as the welding of the joint 8 progresses. Thus the container with the top 10 in place on the walls 9 is positioned as indicated in Figs. 1 and 3 and then the upper welding wheel 15 is moved down to grip the joint in the bite of the welding wheels with the required pressure for welding. The electric current is now applied to the joint while the upper welding wheel is driven through its connections with the drive shaft 29. This turns the container at a suitable velocity about its axis by frictional contact with the welding wheels. Simultaneously with this motion I prefer to turn the horn 17 through its driving connections with the shaft 21 and thus maintain the horn out of contact with the container. The initial relative positions of the horn, lower welding wheel and container are indicated in Fig. 4 while Fig. 5 illustrates the corresponding positions when the container has been rotated a quarter of a revolution. Similarly Figs. 6 and 7 illustrate the relative positions when the welding has progressed one-half and three-quarters of a revolution, respectively. Upon the completion of a revolution the joint 8 is neatly and securely welded and the machine is stopped. The container is finally removed from the machine after raising the upper welding wheel 15 to its dotted line position shown in Fig. 1.

It will now be evident that the work is moved by frictional contact with the welding wheels and that, as the opening 11 revolves, the horn 17 follows the opening and makes one complete revolution while the container makes a complete revolution. By mere change in the extent of the offset of the horn 17, the machine may be adapted to weld joints through an opening in the periphery of a container, tank or other work. By my arrangement of the axis of the welding wheel 16 in spaced alignment with the axis of the supporting shaft 18, I eliminate side thrust such as would otherwise interfere with the proper rotation of the horn in following the off center opening in the work.

Having described my invention, what I claim as new and desire to protect by Letters Patent is:

1. In a machine of the class described, a welding wheel, a substantially U-shaped horn supporting said wheel and means supporting said horn for rotation about the axis of said wheel.

2. In a machine of the class described, a welding wheel, a substantially U-shaped horn having one end revolubly supporting said wheel and means supporting the other end of said horn for rotation about the axis of said wheel.

3. In a machine of the class described, a welding wheel, a substantially U-shaped horn supporting said wheel, means supporting said horn for rotation about the axis of said wheel and power-driven means for revolving said horn, said wheel being arranged to rotate relative to said horn.

4. In an electric welding machine having coacting welding wheels adapted to receive the work between their adjacent peripheries, a shaft for supporting one of said wheels mounted coaxially and in spaced relation therewith and a horn formed with a portion offset laterally of the axis of said last mentioned wheel and connecting said wheel to said shaft, said wheel being revoluble on said horn and said horn being fixed with respect to said shaft and revoluble about the axis of the same.

5. In an electric welding machine having coacting welding wheels adapted to receive the work between their adjacent peripheries, a shaft for supporting one of said wheels mounted in spaced relation therewith and a U-shaped horn connecting said wheel to said shaft, said wheel being revoluble on one end of said horn and the other end of said horn being rigidly secured to said shaft to revolve therewith.

6. In an electric welding machine having coacting wheels adapted to form welded joints between their adjacent peripheries, a rotary support for one of said wheels disposed in spaced relation thereto and a horn having a portion offset laterally of the axis of said last mentioned wheel and connecting said wheel to said support, said wheel being revoluble relative to said horn and said horn being fixed with respect to said support and revoluble about the axis of the same.

7. In an electric welding machine having coacting welding wheels adapted to receive the work between their adjacent peripheries, a rotary support for one of said wheels disposed coaxially therewith and spaced therefrom, a horn having a portion offset laterally of the axis of said last mentioned wheel and connecting the same to said support, said wheel being free to rotate relative to said horn and said horn being integral with said support and revoluble about the axis of the same and power driven means for positively revolving said horn and for rotating at least one of said welding wheels.

8. A machine for forming a circular weld concentric with the axis of a container, said container having an opening offset laterally from said axis, comprising a welding wheel adapted to be inserted through said opening to engage the interior of said container along the joint to be welded, a support for said wheel revoluble about an axis disposed in alignment with the axis of said wheel and spaced therefrom and having an offset portion formed to enter said opening in said container and a second welding wheel arranged to engage the outer periphery of said container and to coact with said first mentioned wheel in forming said weld.

9. A machine for forming an annular, welded joint concentric with the axis of a container, said container having an opening offset laterally from said axis, comprising a welding wheel adapted to be inserted through said opening to engage the interior of said container along the joint to be welded, a shaft mounted for rotation about an axis concentric to said wheel, a horn supporting said wheel on said shaft and having an offset portion formed to enter said opening in said container and a second welding wheel arranged to engage the outer periphery of said container and to coact with said first mentioned wheel in forming said welded joint.

10. A machine for forming a circular weld concentric with the axis of a container, said container having an opening offset laterally from said axis, comprising a welding wheel adapted to be inserted through said opening to engage the interior of said container along the joint to be welded, a revoluble support for said wheel having an offset portion formed to enter said opening in said container, a second welding wheel arranged to engage the outer periphery of said container and to coact with said first mentioned wheel in forming said weld and power driven means for rotating said second welding wheel.

ISAIE J. B. DEMERS.